Oct. 8, 1940.  M. PARRISH, JR., ET AL  2,217,135
EXTRUDING DIE
Filed May 20, 1940
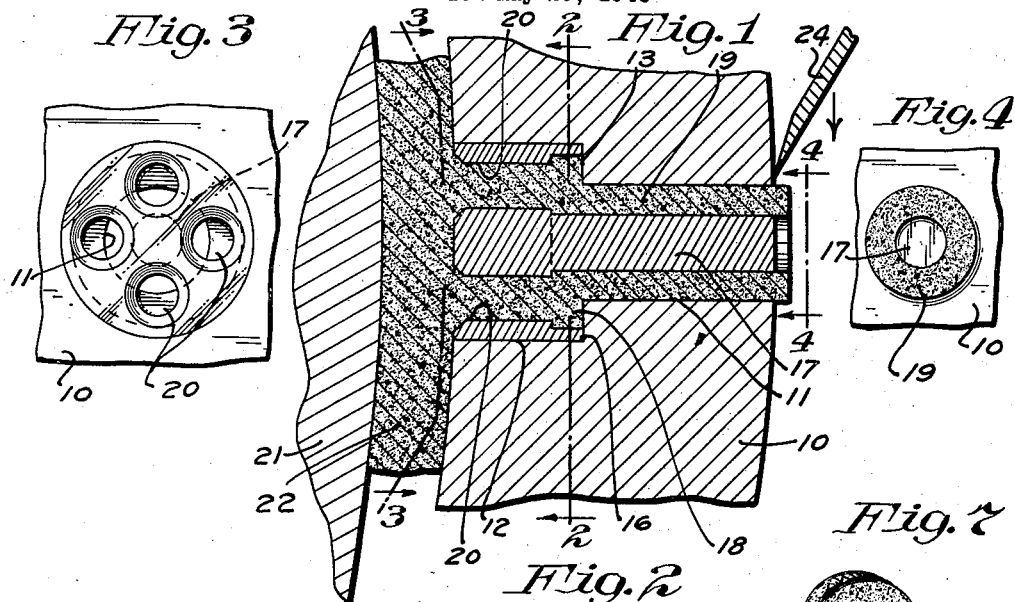
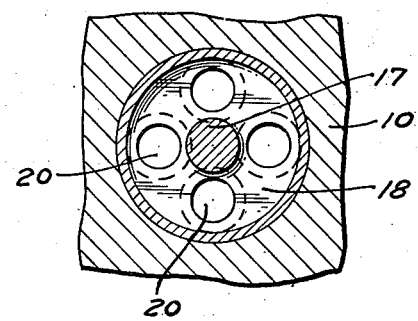
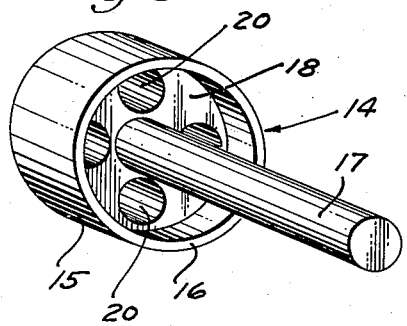
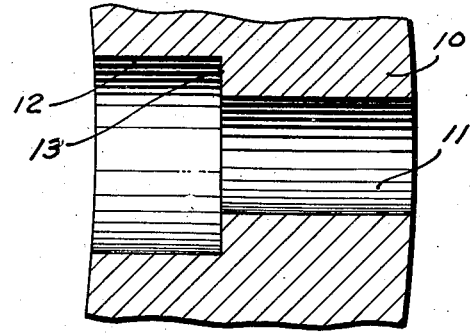
Inventors
Maxfield Parrish Jr.
Thomas R. James
By Arthur K. Wylie
Atty Patented Oct. 8, 1940

2,217,135

UNITED STATES PATENT OFFICE

2,217,135

EXTRUDING DIE

Maxfield Parrish, Jr., Cambridge, Mass., and Thomas R. James, Minneapolis, Minn., assignors to General Mills, Inc., a corporation of Delaware Application May 20, 1940, Serial No. 336,184

2 Claims. (Cl. 107—14)

This invention relates to dies for the extrusion of macaroni or other tubular edible products of a similar nature and more particularly to apparatus of this type wherein the extruded dough-like material is severed at intervals to form rings.

An object of the invention is to provide an improved and efficient form of extruding die, and one of the parts of which can be readily and efficiently manufactured and easily assembled or disassembled.

These and other objects which will hereinafter appear are accomplished by this invention which is fully described in the following specification and shown in the accompanying drawing in which:

Figure 1 is a partial section through an extruding die and associated parts embodying the invention;

Fig. 2 is a section on the line 2 of Figure 1;

Figs. 3 and 4 are end elevations of the extruding die as viewed on the lines 3 and 4 respectively of Figure 1;

Fig. 5 is a perspective view of the insert removed;

Fig. 6 is a view similar to Figure 1 showing the die block or ring with the die removed; and Fig. 7 is a perspective view of a macaroni ring as made by this apparatus.

The embodiment illustrated comprises a die block or ring 10 which is preferably stationary and has a hole 11 therein, as shown in Fig. 6, the inner end of which has an enlarged offset cylindrical portion 12 providing a shoulder 13 to receive the insert represented generally by the numeral 14.

This insert has a cylindrical portion 15 having a driving fit with the enlarged cylindrical offset portion 12. The rim 16 of the cylindrical portion 15 of the insert thus bears against the shoulder 13 and this, together with the cylindrical portions of the insert and hole, serve to accurately position the insert in the die block or ring.

The insert has an axial extension in the form of a reduced pin 17 which extends through the opening 11 and is preferably of such a length that it is flush with the outer surface of the die block or ring 10.

Within the rim 16 is located an annular depression or counterbore 18 which communicates directly with the annular space 19 between the pin 17 and the hole 11 through which the macaroni is extruded.

A series of holes 20, preferably four in number, are disposed about the longitudinal axis of the insert and extend from the inner face of the insert into the annular depression 18.

In the embodiment shown, the die block 10 is preferably stationary and cylindrical in form, the holes 11 being many in number and having their axes radial with respect to the die block, each having its insert.

In this form, a roller 21 is mounted to move slowly about an axis slightly eccentric to the axis of the die ring 10, while additional pressure is exerted upon dough 22 to feed it into the space between the roller 21 and the die ring so that the roller is slowly moved toward each die insert. Some of this dough will be squeezed through the holes 20 into the annular depression 18 where the streams of dough from these four holes meet and pass out through the annular space 19.

Thus a tube of macaroni is extruded which has a shape corresponding to that of the annular space 19. In this instance, it is desired that this tube shall be cut at intervals to form a thin ring 23, as shown in Fig. 7. To accomplish this, I have provided a knife 24, carried upon a suitable support, not shown, which is adapted to move about the axis of the die ring 10 while the edge of the blade bears against the periphery of the die ring to sever the macaroni tube into rings 23. The knife 24 travels preferably at the same rotative speed as that of the roller 21 so that on each actuation of the roller some of the material is extruded through the die and this is followed by the knife 24 which severs it to form a macaroni ring 23.

This form of die adapts itself also to the manufacture of macaroni as such. In that case, the knife 24 is omitted and the die ring 10 becomes in a convenient form of die block and the dough to be extruded may be fed to the dies in any well known manner.

Thus it will be seen that we have provided a very simple and efficient form of macaroni die and one which lends itself to mass production. The assembling operation consists merely in driving the insert in place and it is removed by the simple operation of driving it out by means of the pin 17.

While we have shown and described but a single embodiment of our invention, it is to be understood that it is capable of many modifications. Changes, therefore, may be made which do not depart from the spirit and scope of our invention as disclosed in the appended claims.

We claim as our invention:

1. In a die of the type described, a die block having a hole therethrough which has an enlarged offset cylindrical portion, an insert having a cylindrical portion adapted to fit within the cylindrical portion of the die block and having a reduced pin extending axially through the hole but spaced therefrom to form an annular opening through which material may be extruded, an annular depression about the pin in the face of the cylindrical portion of the insert, and a plurality of holes through the cylindrical portion of the insert and extending into the annular depression.

2. In a die of the type described, a die block having a hole therethrough which has an enlarged offset cylindrical portion, an insert having a cylindrical portion adapted to fit within the cylindrical portion of the die block and having a reduced pin extending axially through the hole but spaced therefrom to form an annular opening through which material may be extruded, said opening having a length greater than the diameter of said pin, an annular depression about the pin in the face of the cylindrical portion of the insert, and a plurality of holes through the cylindrical portion of the insert and extending into the annular depression.

MAXFIELD PARRISH, Jr.
THOMAS R. JAMES.